US011172723B2

(12) United States Patent
Summerville

(10) Patent No.: US 11,172,723 B2
(45) Date of Patent: *Nov. 16, 2021

(54) SHOCK-ABSORBING FACE GUARD CONNECTOR FOR ATHLETIC HELMET

(71) Applicant: Hobart-Mayfield Inc., Shelby Township, MI (US)

(72) Inventor: Justin H. Summerville, St. Clair Shores, MI (US)

(73) Assignee: Hobart-Mayfield Inc., Shelby Township, MI (US)

( * ) Notice: Subject to any disclaimer, the term of this patent is extended or adjusted under 35 U.S.C. 154(b) by 163 days.

This patent is subject to a terminal disclaimer.

(21) Appl. No.: 16/543,912

(22) Filed: Aug. 19, 2019

(65) Prior Publication Data

US 2020/0154815 A1 May 21, 2020

Related U.S. Application Data

(60) Provisional application No. 62/768,885, filed on Nov. 17, 2018.

(51) Int. Cl.
*A42B 3/20* (2006.01)
*F16F 1/44* (2006.01)

(52) U.S. Cl.
CPC .......... *A42B 3/20* (2013.01); *F16F 1/44* (2013.01); *F16F 2224/02* (2013.01); *F16F 2224/025* (2013.01); *F16F 2224/0225* (2013.01)

(58) Field of Classification Search
CPC .... A42B 3/20; A42B 3/222; F16F 1/44; F16F 2224/025
See application file for complete search history.

(56) References Cited

U.S. PATENT DOCUMENTS

| | | | |
|---|---|---|---|
| 1,892,943 A | | 1/1933 | Geyer |
| 3,729,746 A | * | 5/1973 | Humphrey ............... A42B 3/20 2/9 |
| 3,854,146 A | | 12/1974 | Dunning |
| 4,086,664 A | | 5/1978 | Humphrey et al. |
| 4,271,537 A | | 6/1981 | Bowlus et al. |
| 4,370,759 A | * | 2/1983 | Zide ....................... A63B 71/10 2/424 |
| 4,390,995 A | | 7/1983 | Walck |
| 4,633,531 A | | 1/1987 | Nimmons |
| 4,837,866 A | | 6/1989 | Rector et al. |
| 6,079,053 A | | 6/2000 | Clover, Jr. et al. |
| 7,146,652 B2 | | 12/2006 | Ide et al. |
| 8,819,871 B2 | | 9/2014 | Maddux et al. |

(Continued)

OTHER PUBLICATIONS

Extended European Search Report and Written Opinion for Application No. 19193240.9 dated Feb. 26, 2020 (9 pages).

*Primary Examiner* — Tajash D Patel
(74) *Attorney, Agent, or Firm* — Reising Ethington P.C.

(57) ABSTRACT

A shock-absorbing face guard connector for an athletic helmet such as a helmet worn in American football, ice hockey, cricket, and baseball and softball, among other possible applications. The shock-absorbing face guard connector couples a face guard to the athletic helmet, and can absorb some of the forces resulting from a strike or impact to the face guard amid play and at other times. The shock-absorbing face guard connector includes a compressible piece that can compressibly yield when the face guard is struck or otherwise impacted.

20 Claims, 6 Drawing Sheets

(56) References Cited

U.S. PATENT DOCUMENTS

| | | | |
|---|---|---|---|
| 9,265,297 B2 * | 2/2016 | Warmouth | A63B 71/10 |
| 9,750,298 B2 | 9/2017 | Summerville | |
| 9,788,591 B2 | 10/2017 | Ide et al. | |
| 2011/0214224 A1 | 9/2011 | Maddux et al. | |
| 2011/0271428 A1 | 11/2011 | Withnall et al. | |
| 2017/0056752 A1 | 3/2017 | Tubbs | |
| 2019/0313725 A1 * | 10/2019 | Princip | A42B 3/20 |

* cited by examiner

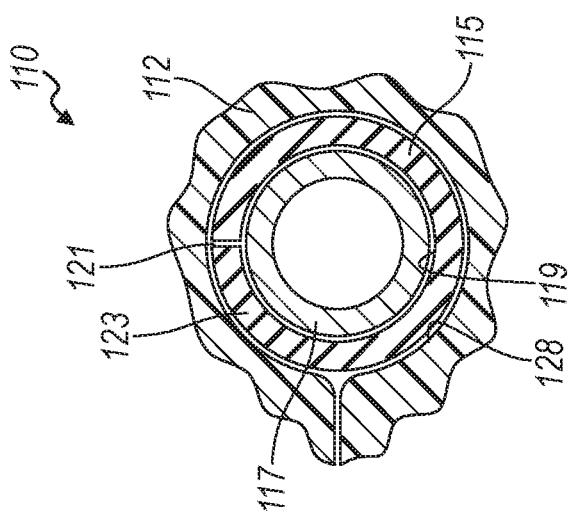
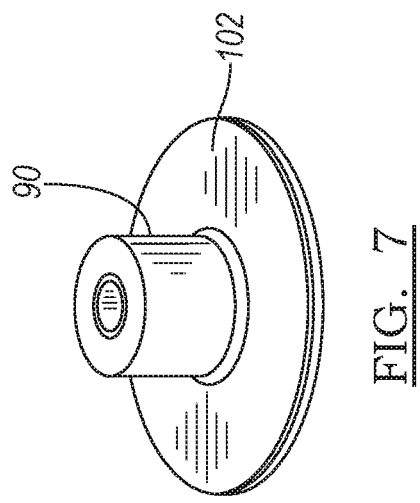
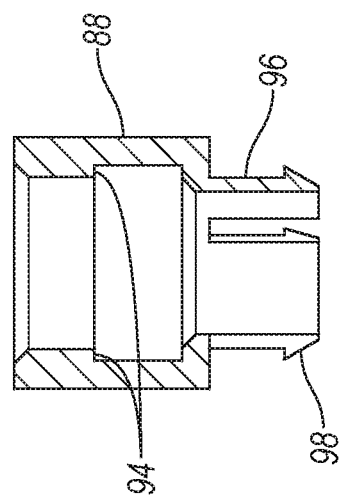
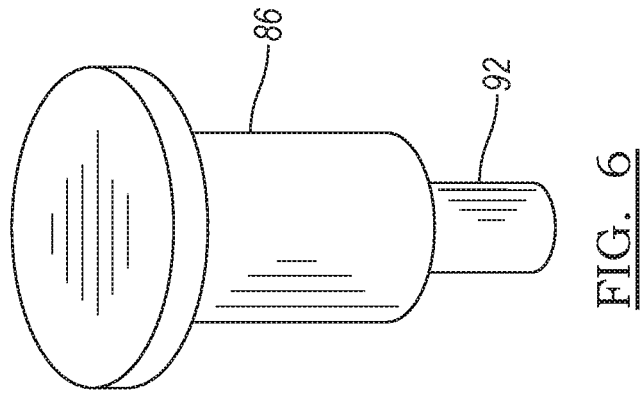
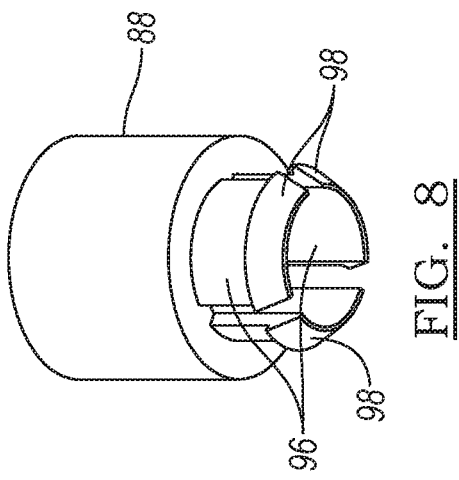

SHOCK-ABSORBING FACE GUARD CONNECTOR FOR ATHLETIC HELMET

CROSS-REFERENCE TO RELATED APPLICATION

This application claims the benefit of U.S. Provisional Patent Application No. 62/768,885 filed on Nov. 17, 2018.

FIELD OF THE DISCLOSURE

The present disclosure relates generally to athletic helmets, and more particularly to a connector for coupling a face guard to an athletic helmet.

BACKGROUND

Athletic helmets are worn by participants in many sports and activities such as American football, ice hockey, cricket, and baseball and softball, as well as elsewhere. In American football, for instance, a face guard is commonly coupled to the helmet in order to provide some level of protection to the wearer's face. The coupling between the face guard and helmet is typically a rigid one that precludes relative movement between the face guard and helmet. Consequently, when the face guard is struck by an opponent amid play or impacted in some other way, the resulting forces are transmitted from the face guard and through the coupling and through the helmet to the wearer.

SUMMARY

In an embodiment, a shock-absorbing face guard connector for an athletic helmet may include a base, a compressible piece, a sleeve, and a fastener assembly. The base has a bore that spans through it. The bore is for receiving a section of a face guard. The base has a cavity. The compressible piece resides partially or more in the cavity of the base. The compressible piece has a transverse extent. The sleeve extends partially or more through the cavity and has a working surface in confrontation with the compressible piece. The extent of confrontation between the working surface and the compressible piece in a transverse direction constitutes a majority or more of the full extent of the transverse extent of the compressible piece. The fastener assembly is receivable through the sleeve. The fastener assembly is used to attach the shock-absorbing face guard connector to the athletic helmet.

In another embodiment, a shock-absorbing face guard connector may include a base, a compressible piece, a sleeve, and a fastener assembly. The base has a first bore that spans through it, and the base has a cavity. The cavity defines an inboard section and an outboard section. The compressible piece resides at the outboard section of the cavity. The sleeve resides at the inboard section of the cavity. The sleeve has a second bore that spans through it. The fastener assembly is received through the second bore of the sleeve. Amid use of the shock-absorbing face guard connector and upon impact to a face guard connected by the shock-absorbing face guard connector, the base moves relative to the sleeve. The movement of the base compresses the compressible piece. And, by way of its location at the outboard section, substantially all of the compressible piece is subject to compression when the base moves relative to the sleeve.

In yet another embodiment, a shock-absorbing face guard connector may include a base, a compressible piece, a plate and a sleeve unit, and a fastener assembly. The base has a first bore and a cavity. The compressible piece resides in the cavity. The compressible piece has a first surface that is generally planar. The plate and sleeve unit has a plate portion and a sleeve portion. The plate portion is situated at a top side of the base. The sleeve portion resides in the cavity. The sleeve portion has a second bore and has a second surface that is generally planar. The fastener assembly is received through the second bore of the sleeve. The fastener assembly includes a fastener. In assembly of the shock-absorbing face guard connector, the first surface of the compressible piece and the second surface of the plate and sleeve unit make surface-to-surface confrontation.

BRIEF DESCRIPTION OF THE DRAWINGS

The following detailed description of an embodiment is set forth with reference to the accompanying drawings, in which:

FIG. 6 is a perspective view of a fastener;

FIG. 7 is a perspective view of a base plate.

FIG. 8 is a perspective view of an intermediate extender piece;

FIG. 9 is a sectional view of the intermediate extender piece; and

FIG. 10 is a sectional view of an embodiment of the shock-absorbing face guard connector having a second compressible piece.

DETAILED DESCRIPTION

Figure 1:
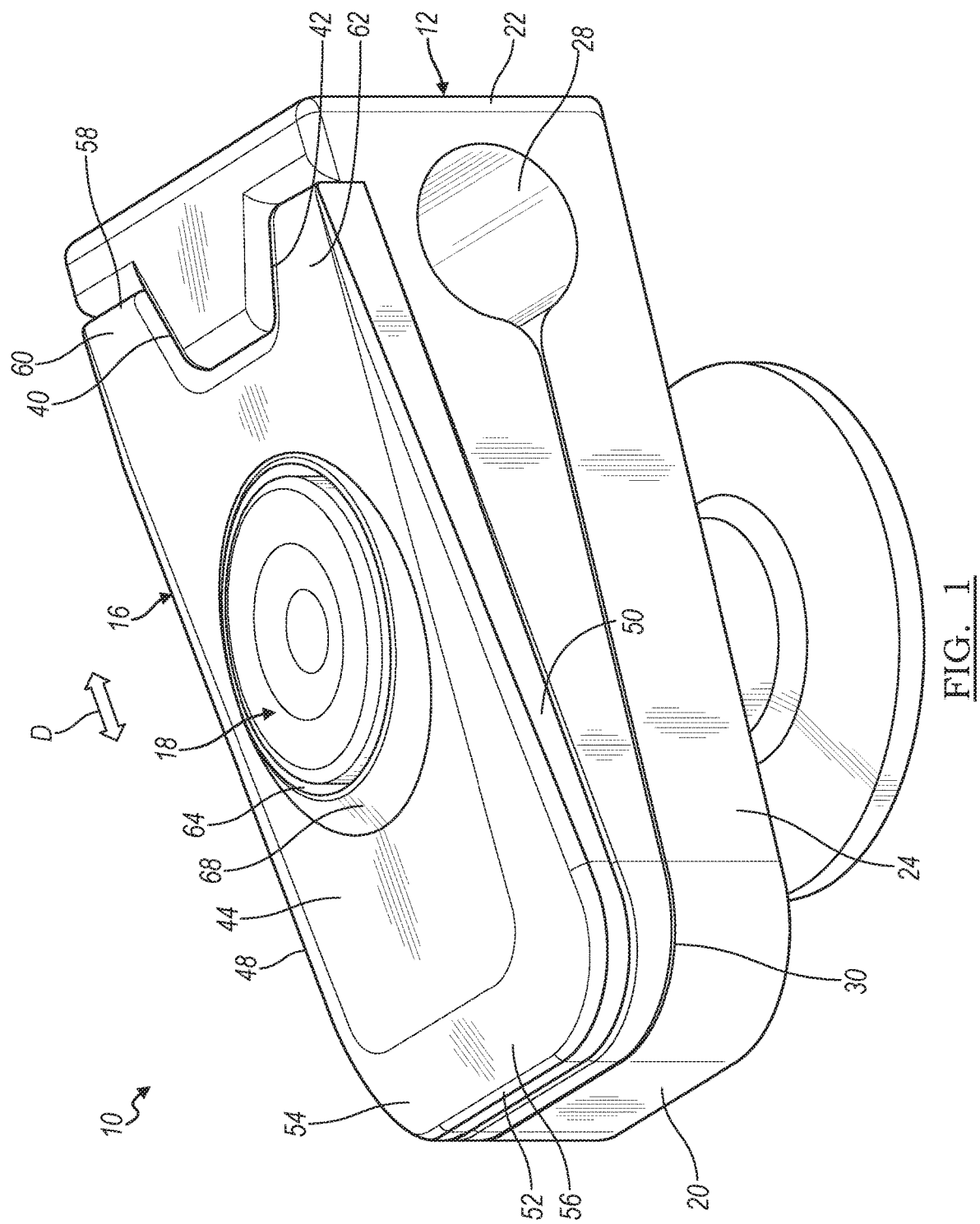
FIG. 1 is a perspective view of an embodiment of a shock-absorbing face guard connector that is used to couple a face guard to an athletic helmet.

Referring in more detail to the drawings, the figures illustrate embodiments of a shock-absorbing face guard connector 10 (hereafter "connector") for an athletic helmet such as a helmet worn in American football, ice hockey, cricket, or baseball and softball, among other possible applications. The connector 10 couples a face guard to the athletic helmet, and absorbs some or all of the forces resulting from a strike and impact to the face guard amid play, practice, or elsewise. The wearer of the athletic helmet is hence spared at least part of the forces that might otherwise be borne more directly by him/her. The coupling between the athletic helmet and face guard can involve several connectors 10 at different locations on the athletic helmet and face guard. Absorbing forces from strikes and other types of impacts is sought and beneficial in youth sports and activities, as well as recreational, collegiate, amateur, and professional sports and activities.

The connector 10 can have different designs, constructions, and components in different embodiments, and than those described and depicted here. In the embodiment presented by FIGS. 1-5, the connector 10 includes a base 12, a compressible piece 14, a plate and sleeve unit 16, and a fastener assembly 18.

The base 12 receives and holds a section of the face guard, and sits directly against an outer surface of the athletic helmet. A segmented depiction of a portion 13 of the athletic helmet is presented in FIG. 3 for demonstrative purposes. The base 12 can also be referred to as a body. The base 12 can have different designs and constructions in different embodiments. Referring to FIGS. 1-4, here the base 12 has a one-piece structure, and can be composed of a plastic material or another type of material. In one specific example, the base 12 is composed of a thermoplastic resin that goes by the name Surlyn® and is provided by the DuPont company; still, other example materials exist. The base 12 has a front wall 20, a back wall 22, a first side wall 24, and a second side wall 26. A first bore 28 is defined through the back wall 22, and receives the section of the face guard when the connector 10 is employed to couple the face guard to the athletic helmet. To initially receive the face guard, the base 12 has a slit 30 spanning from the first bore 28 and through the front wall 20. The slit 30 spans completely through the first and second side walls 24, 26 so that the base 12 can open and accept the face guard into the first bore 28. Further, an upper section of the base 12 can have a partially or more beveled edge 32 that corresponds to a similar construction of the plate and sleeve unit 16, as subsequently described. The beveled edge 32 can extend along the front wall 20 and over a section or more of the first and second side walls 24, 26.

Figure 2:
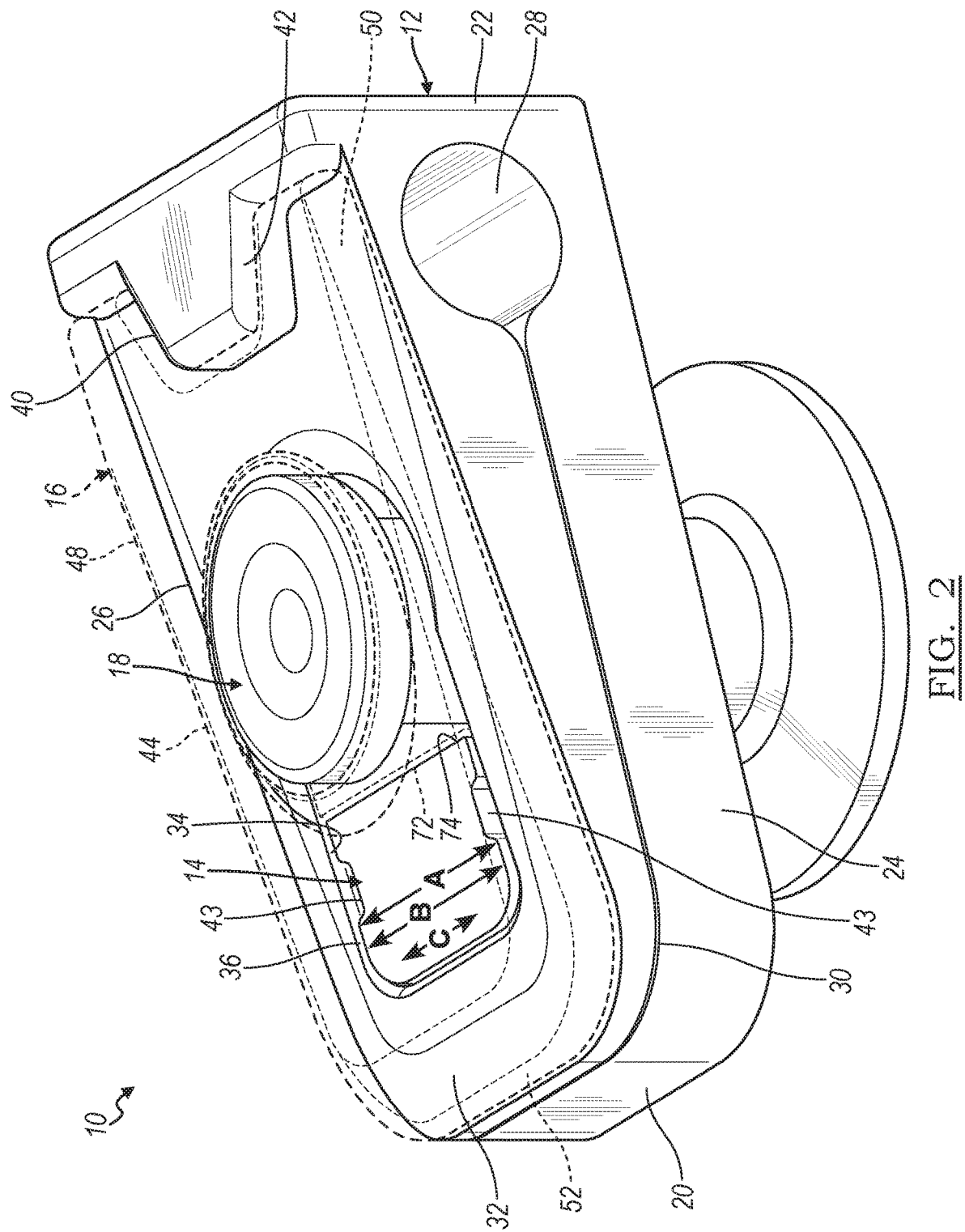
FIG. 2 is a perspective view of the shock-absorbing face guard connector of FIG. 1, with a topside component depicted partially transparent to reveal interior components of the shock-absorbing face guard connector.
Figure 3:
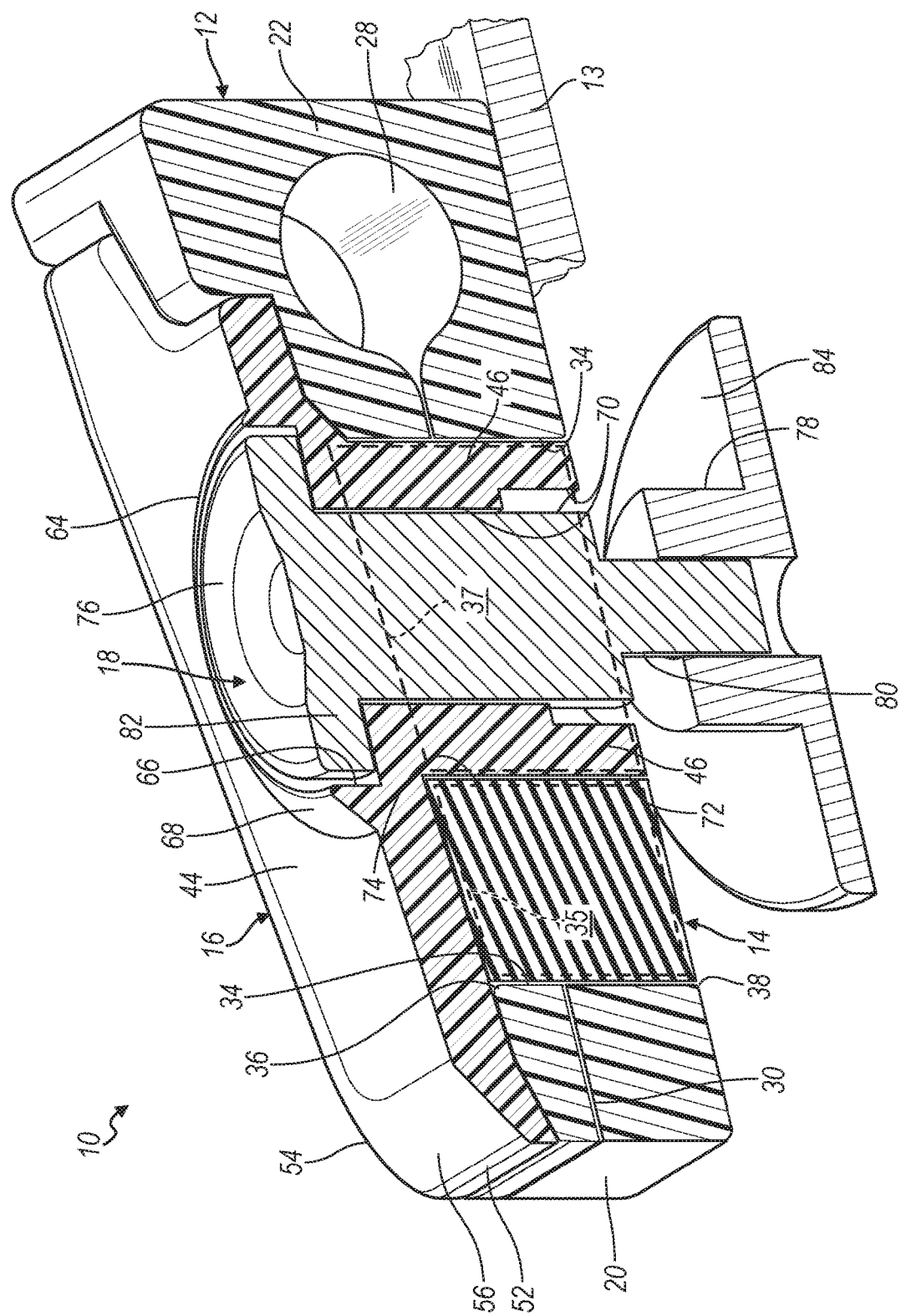
FIG. 3 is a sectional view of the shock-absorbing face guard connector with one embodiment of a fastener assembly.

With particular reference to FIGS. 2 and 3, a cavity 34 is defined in part by inner surfaces of the front wall 20, back wall 22, first side wall 24, and second side wall 26. When the connector 10 is assembled in use, an outboard section 35 of the cavity 34 receives the compressible piece 14 and hence the compressible piece 14 resides partially or more within the cavity 34 at the outboard section 35. The outboard section 35 is a forward region of the cavity 34 with respect to receipt of the face guard coupling at the first bore 28. Opposite the outboard section 35, the cavity 34 has an inboard section 37 for receipt of the plate and sleeve unit 16. The inboard section 37 is a rearward region of the cavity 34 with respect to the face guard coupling at the first bore 28. The cavity 34 has an open top side 36 and an open bottom side 38. In the assembly procedure, the compressible piece 14 can be inserted into the open top side 36 or into the open bottom side 38. The top side of the base 12 has a stepped-cutout design and construction with a first notched recess 40 and a second notched recess 42. As will be described in greater detail below, the first and second notched recesses 40, 42 constitute one-half of an extension-recess interfit that pilots movement of the connector 10 when the face guard is struck or otherwise impacted amid use of the athletic helmet.

Figure 4:
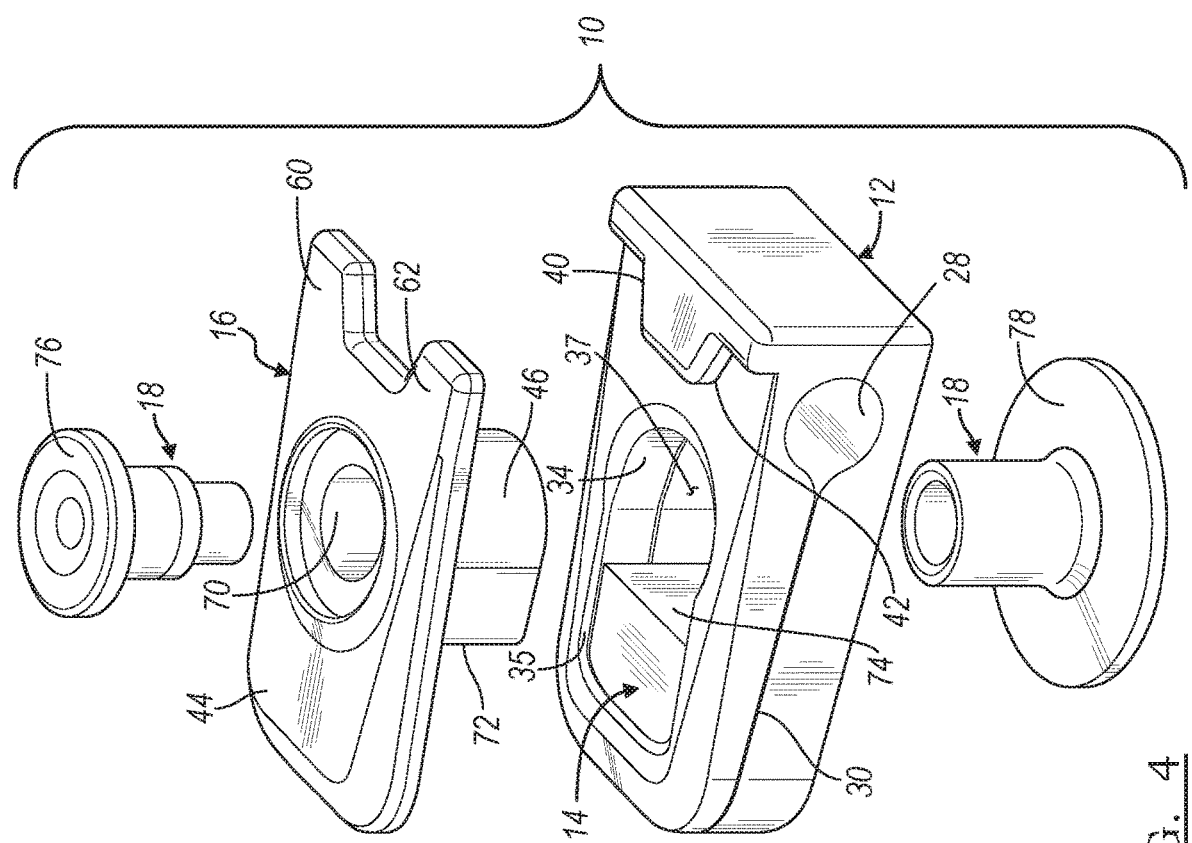
FIG. 4 is an exploded view of the shock-absorbing face guard connector.
Figure 5:
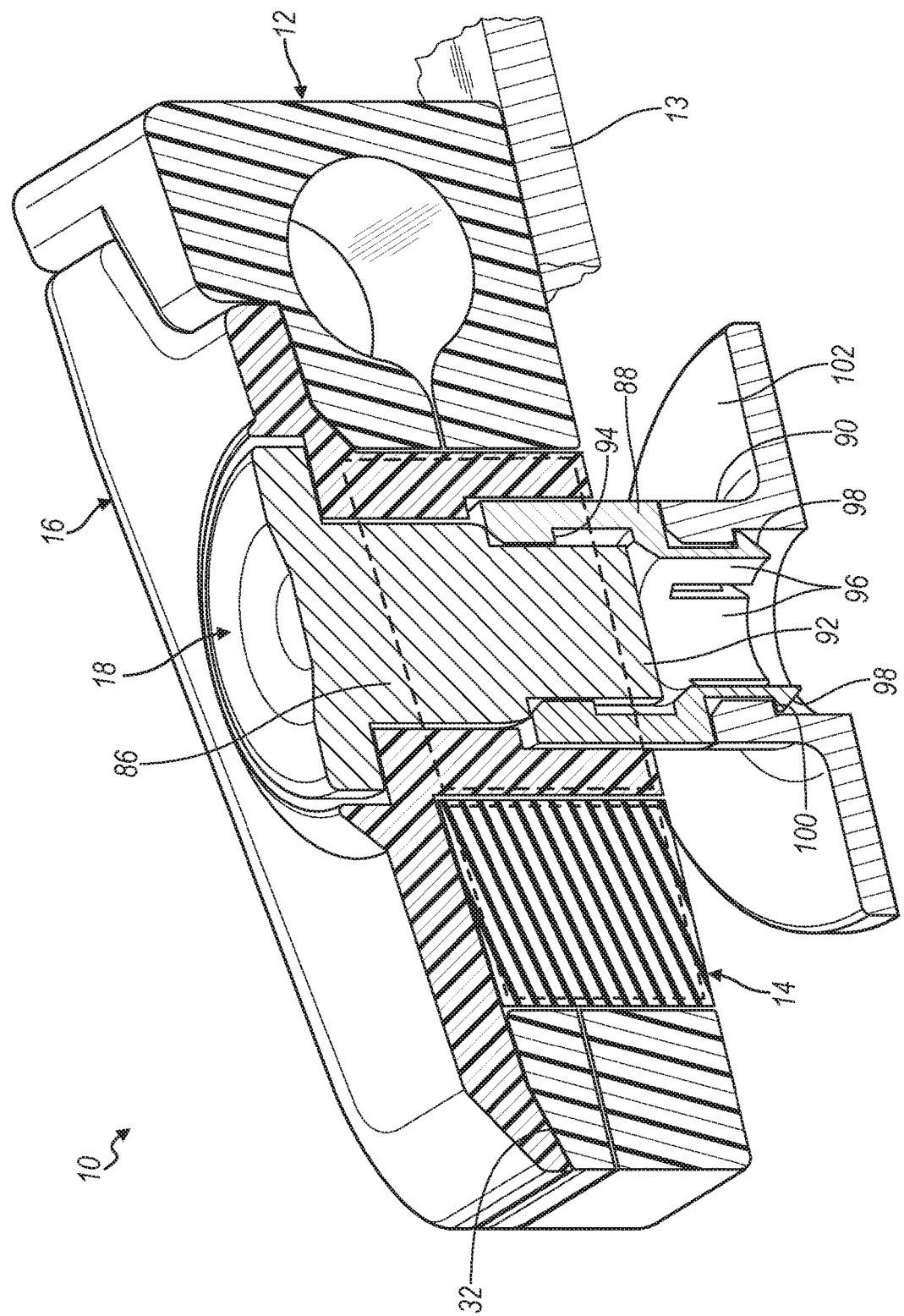
FIG. 5 is a sectional view of the shock-absorbing face guard connector with another embodiment of a fastener assembly.

The compressible piece 14 is capable of compressibly yielding during use of the connector 10 in order to absorb at least a portion of the shock of forces that the helmet wearer might otherwise more acutely and directly experience. The compressible piece 14 can have different designs and constructions in different embodiments. Referring to FIGS. 2-4, here the compressible piece 14 can be composed of a rubber material, a foam material, a low-durometer plastic material, or some other material that can compress and uncompress again and again. In one specific example, the compressible piece 14 is composed of a polymer material that goes by the name Sorbothane® and is provided by Sorbothane, Inc.; still, other example materials exist. In the specific example, the material possesses a hardness of eighty-five (85) durometer; still, other example hardnesses are possible. The compressible piece 14 can be sized and constructed for reception within the cavity 34 at its outboard section. The compressible piece 14 has a solid and one-piece construction in this embodiment, and can occupy less than approximately one-half of the total the size of the cavity 34 in which it resides. As shown in FIG. 2, the compressible piece 14 can have notches 43 that aid in its compressibility. Taken from side-to-side, the compressible piece 14 has a transverse extent A. As demonstrated particularly in FIG. 2, the transverse extent A is approximately equivalent to a corresponding transverse extent B of the cavity 34.

The plate and sleeve unit 16 receives the fastener assembly 18 in assembly and installation of the connector 10 on the athletic helmet, and remains static relative to the base 12 when the connector 10 is in the midst of effecting its shock absorbing functionality. The plate and sleeve unit 16 can have different designs and constructions in different embodiments. Referring again to FIGS. 1-4, in this embodiment the plate and sleeve unit 16 constitutes a single and monolithic and unitary component of the connector 10; in other embodiments, the plate and sleeve could be separate and discrete components. The plate and sleeve unit 16 can be composed of a plastic material, a metal material, a ceramic material, or some other material. In one example, the plate and sleeve unit 16 is composed of a polycarbonate material; still, other example materials exist. The plate and sleeve unit 16 in the embodiment presented has a plate or shield portion 44 and a sleeve portion 46. The plate portion 44 is situated at the top side of the base 12 and remains exposed outwardly when the connector 10 is installed in use on the athletic helmet. Since it is exposed, the plate portion 44 could be colored, have indicia, and/or be decorated in another manner in order to match an athletic jersey and/or the athletic helmet, if so desired.

The plate portion 44 has a first side surface 48 and a second side surface 50. The distance between the first and second side surfaces 48, 50 can be the same as that between the first and second side walls 24, 26 of the base 12. At a front side 52, the plate portion 44 can have a partially or more beveled edge 54 extending along the front side 52 and over first and second sides of the plate portion 44. The beveled edge 54 makes a distal leading end portion 56 that is slanted inwardly toward the athletic helmet in installation. The beveled edge 54, and especially the distal leading end portion 56, can work to more readily deflect impact and loads directed thereto, and hence minimize or altogether avert deformation of the plate portion 44 that might otherwise occur. Near a back side 58, and turning particularly to FIG. 1, the plate portion 44 has a first extension 60 and a second extension 62 that constitute the other half of the extension-recess interfit that pilots movement of the connector 10. The first extension 60 is sized and shaped complementary to the first notched recess 40 so that the two fit together in assembly, and likewise the second extension 62 is sized and shaped complementary to the second notched recess 42 so that the two fit together in assembly. Indeed, slanted surfaces of the first and second extensions 60, 62 complement confronting and opposing slanted surfaces of the first and second notched recesses 40, 42. In other embodiments not depicted in the figures, the sizes and shapes of the extension-recess interfit can differ, while still furnishing the piloted movement functionality described below; for instance, the confronting surfaces could be stepped and need not necessarily be slanted, and/or the plate portion 44 could be recessed while the base 12 has complementary extensions.

Further, the fastener assembly 18 can be partially or more inset within the exposed plate portion 44 so that the fastener assembly 18 itself is not immediately exposed. In this regard, and referring to FIGS. 1 and 3, the plate portion 44 can have a counterbore 64 for receiving a part of the fastener assembly 18. The counterbore 64 defines a recess 66 and has a ramped lip 68 bordering and surrounding the recess 66. The ramped lip 68, in cooperation with the recess 66, can work to more readily deflect impact and loads and even physical contact directed at the fastener assembly 18.

With reference to FIGS. 2-4, the sleeve portion 46 extends unitarily from the plate portion 44. The sleeve portion 46 has a second bore 70 spanning from its top and to its bottom. The second bore 70 receives insertion of the fastener assembly 18. The sleeve portion 46 is received within the cavity 34 and resides at the inboard section 37 of the cavity 34. Indeed, the sleeve portion 46 occupies the remaining portion of the cavity 34 that is not occupied by the compressible piece 14. The sleeve portion 46 has a working surface 72 that directly confronts an opposing surface 74 of the compressible piece 14. The working surface 72 has a planar configuration, and the opposing surface 74 has a complimentary planar configuration. The working surface 72 and opposing surface 74 make direct surface-to-surface abutment when the connector 10 is in the midst of effecting its shock absorbing functionality, as well as when shock absorption is not being effected. The side-to-side extent of confrontation and abutment established between the working surface 72 and opposing surface 74 along a transverse direction C constitutes the full extent of the transverse extent A of the compressible piece 14. It has been found that this relationship influences the effectiveness of the shock absorbing functionality of the connector 10. Because the sleeve portion 46 and compressible piece 14 confront and abut each other over this full transverse extent, a large scope of the compressible piece 14 is utilized and takes part in compression and energy and force absorption than would otherwise be the case. This maximizes compression of the compressible piece 14 and brings about a more comprehensive absorption of energy and force of the connector 10. In other embodiments, the extent of confrontation and abutment need not be the full extent just described, and instead could be a majority or more of the full extent of the transverse extent A. Opposite the working surface 72, the sleeve portion 46 has a partially cylindrical configuration that complements the configuration of the inboard section 37.

The fastener assembly 18 attaches the connector 10 to the athletic helmet, and holds it thereagainst. The fastener assembly 18 can have different designs and constructions and components in different embodiments—two embodiments are depicted by the figures. In a first embodiment of FIGS. 3 and 4, the fastener assembly 18 includes a fastener 76 and a nut plate 78. The fastener 76 can be a bolt with a partially externally threaded shank 80 and a head 82. The nut plate 78 tightens around the shank 80 and itself has internal threads. In assembly and installation, the nut plate 78 resides on an opposite side of the athletic helmet than the base 12 (this is depicted partially by FIG. 3). In this regard, the nut plate 78 has a flange 84 for seating at a backside of the athletic helmet.

A second embodiment of the fastener assembly 18 is presented by FIGS. 5-9. In this embodiment the fastener assembly 18 has a quick release functionality for more readily mounting and demounting the connector 10 to and from the athletic helmet. Here, the fastener assembly 18 includes a fastener 86, an intermediate extender piece 88, and a base plate 90. The fastener 86 can be a multi-piece component and can be manipulated by a user to bring the fastener 86 between two states. In a first state, one or more projections extend radially-outwardly from a shank 92 of the fastener 86. The fastener 86 remains in the first state under normal and non-manipulated conditions. In a second state, the projections are retracted radially-inwardly within the shank 92. The fastener 86 is brought to the second state upon manipulation by a user, such as its head being pressed by the user. The intermediate extender piece 88 is situated between the fastener 86 and the base plate 90 and serves to increase the overall axial length of the fastener assembly 18 which may be called for in certain applications. For instance, some quick-release fasteners supplied with helmets may lack the overall axial length that is needed to properly span through the connector 10 to the base plate 90, and hence the intermediate extender piece 88 acts as an adaptation to lengthen such fasteners for use with the connector 10; of course, some quick-release fasteners may have the proper length and may not need the intermediate extender piece 88. The intermediate extender piece 88 has an internal ledge 94 for capturing the projections of the fastener 86, and hence keeping the intermediate extender piece 88 and fastener 86 held together. The intermediate extender piece 88 further has multiple extensions 96 with barbed ends 98 for capture with an internal ledge 100 of the base plate 90, and hence keeping the intermediate extender piece 88 and base plate 90 held together. Like the nut plate 78 of the first embodiment, the base plate 90 has a flange 102 for seating at a backside of the athletic helmet.

In use, the connector 10 absorbs some or all of the forces exerted from a strike to the face guard, or from some other type of impact to the face guard. For instance, when the face guard is struck, the face guard itself and the base 12 of the connector 10 are displaced by the strike relative to the athletic helmet, relative to the plate and sleeve unit 16, and relative to the components of the fastener assembly 18. The face guard moves slightly backwards relative to a forward-facing region of the athletic helmet. The compressible piece 14 is squeezed by the base 12 against the sleeve portion 46, and hence takes-in and absorbs at least some of the energy and forces exerted by the strike. The energy and force reduction results from a load transmission path that begins at the face guard, goes through the base 12, through the compressible piece 14 (where absorption occurs), through the plate and sleeve unit 16, and then through the fastener assembly 18 and to the athletic helmet. After the strike, the compressible piece 14 returns to its previous size and shape, and urges and returns the base 12 and the face guard to their respective previous positions. In an embodiment in which the connector 10 has the extension-recess interfit, the extension-recess interfit guides an initially linear displacement and movement of the base 12 and guides subsequent movement of the base 12 relative to the plate and sleeve unit 16 once the strike's force is absent. In one example, and referring now to FIG. 1, the extension-recess interfit guides displacement along a direction D. That is, as the base 12 and plate and sleeve unit 16 move away from each other, the separating notched recesses 40, 42 and extensions 60, 62 at least initially move along the direction D.

Testing has shown a force reduction of up to thirty-five percent (35%) in face guards and helmets equipped with connectors similar to the connector 10, compared to those equipped with connectors that lack shock absorption.

FIG. 10 presents another embodiment of a shock-absorbing face guard connector 110. The embodiment of FIG. 10 is similar in many respects to the previous embodiments described and depicted, and many of those similarities will not be repeated here for the sake of brevity. In the embodiment of FIG. 10, the connector 110 includes a second compressible piece 115 in addition to its other components that include a base 112, a first compressible piece (not shown but similar to compressible piece 14), a plate and sleeve unit (not shown but similar to plate and sleeve unit 16), and a fastener assembly (not shown but similar to fastener assemblies 18). The second compressible piece 115 is an optional component and is thought to enhance and augment the energy and force absorption capacity of the first compressible piece 14. The second compressible piece 115 is capable of compressibly yielding during use of the connector 110 in order to absorb at least a portion of the shock of forces that the helmet wearer might otherwise more acutely and directly experience.

The second compressible piece 115 can have different designs and constructions in different embodiments. In the embodiment of FIG. 10, the second compressible piece 115 can be composed of a rubber material, a foam material, a low-durometer plastic material, or some other material that can compress and uncompress again and again. In one specific example, the second compressible piece 115 is composed of the polymer material Sorbothane® and has a hardness of eighty-five (85) durometer; still, other example materials and other hardnesses are possible. The material composition of the second compressible piece 115 can be the same as the material composition of the first compressible piece 14, or can be different from the material composition of the first compressible piece 14. The second compressible piece 115 can be sized and constructed for installation over a section 117 of a face guard, and for reception within a first bore 128 of the base 112. Compared to the first bore 28 of previous embodiments, the first bore 128 of this embodiment may have a larger diameter in order to accommodate the reception of both of the face guard section 117 and the second compressible piece 115. Although FIG. 10 presents a sectional view of the second compressible piece 115, the second compressible piece 115 has a generally cylindrical shape with an axial extent that can approximate the axial extent of the first bore 128; still, other axial extents that are greater or less than that of the first bore 128 are possible for the second compressible piece 115. The second compressible piece 115 has a through-bore 119 for receipt of the face guard section 117, and has a slit 121 spanning completely through a wall 123 of the second compressible piece 115 and spanning the full axial extent of the second compressible piece 115. The slit 121 allows the second compressible piece 115 to open and accept the face guard section 117 so that the second compressible piece 115 can be wrapped around the face guard section 117.

In use, when the face guard is struck, the second compressible piece 115 is squeezed by the face guard section 117 against the base 112 at the first bore 128, and hence takes-in and absorbs at least some of the energy and forces exerted by the strike. After the strike, the second compressible piece 115 returns to its previous size and shape. The second compressible piece 115 is squeezed prior to squeezing of the first compressible piece 14. In this way, the second compressible piece 115 absorbs energy and forces exerted by a strike before the first compressible piece 14 absorbs at least some of the remaining energy and forces of the strike, and hence the combined employment of both of the first and second compressible pieces 14, 115 may result in an ultimately greater force reduction than that produced by employment of the first compressible piece 14 alone.

It is to be understood that the foregoing is a description of one or more exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A shock-absorbing face guard connector for an athletic helmet, the shock-absorbing face guard connector comprising:
   a base having a first bore spanning therethrough for receiving a section of a face guard, said base having a cavity;
   a compressible piece residing at least partially in said cavity of said base, said compressible piece having a transverse extent;
   a sleeve extending at least partially through said cavity and having a working surface in confrontation with said compressible piece, wherein the extent of confrontation between said working surface and said compressible piece in a transverse direction constitutes at least a majority of the full extent of said transverse extent of said compressible piece; and the sleeve having a second bore spanning partially through the sleeve
   a fastener assembly received through said sleeve, said fastener assembly for attaching the shock-absorbing face guard connector to the athletic helmet.

2. A shock-absorbing face guard connector as set forth in claim 1, further comprising a plate situated on said base, said sleeve unitarily extending from said plate.

3. A shock-absorbing face guard connector as set forth in claim 2, wherein said fastener assembly is at least partially counterbored in said plate.

4. A shock-absorbing face guard connector as set forth in claim 2, wherein said plate has a distal leading end portion that is at least partially slanted inward.

5. A shock-absorbing face guard connector as set forth in claim 2, wherein said base and said plate interact with each other via an extension-recess interfit.

6. A shock-absorbing face guard connector as set forth in claim 1, wherein the extent of confrontation between said working surface and said compressible piece constitutes the full extent of said transverse extent of said compressible piece.

7. A shock-absorbing face guard connector as set forth in claim 1, wherein the extent of confrontation between said working surface and said compressible piece constitutes substantially the full extent of a second transverse extent of said cavity.

8. A shock-absorbing face guard connector as set forth in claim 1, wherein said compressible piece occupies an outboard section of said cavity of said base, and said sleeve occupies an inboard section of said cavity.

9. A shock-absorbing face guard connector as set forth in claim 1, wherein said fastener assembly includes a fastener and a nut plate.

10. A shock-absorbing face guard connector as set forth in claim 1, wherein said fastener assembly includes a fastener, a base plate, and an intermediate extender piece situated between said fastener and said base plate.

11. A shock-absorbing face guard connector as set forth in claim 1, wherein said base is displaceable relative to said sleeve, the displacement causing compression of said compressible piece.

12. A shock-absorbing face guard connector as set forth in claim 1, further comprising a second compressible piece residing at least partially in said bore of said base, said second compressible piece placeable at least partially around the section of the face guard.

13. A shock-absorbing face guard connector, comprising:
a base having a first bore spanning therethrough and having a cavity, said cavity defining an inboard section and an outboard section;
a compressible piece residing at said outboard section of said cavity;
a sleeve residing at said inboard section of said cavity, said sleeve having a second bore spanning partially through the sleeve; and
a fastener assembly received through said second bore of said sleeve;
wherein, during use of the shock-absorbing face guard connector and upon impact to a face guard connected by the shock-absorbing face guard connector, said base moves relative to said sleeve, the movement effects compression of said compressible piece, and, via its location at said outboard section, substantially all of said compressible piece undergoes compression amid movement of said base relative to said sleeve.

14. A shock-absorbing face guard connector as set forth in claim 13, wherein said compressible piece resides in said outboard section of said cavity and spans across a full transverse extent of said outboard section, and said sleeve resides in said inboard section of said cavity and spans across a full transverse extent of said inboard section.

15. A shock-absorbing face guard connector as set forth in claim 13, wherein said sleeve has a working surface that is generally planar, said compressible piece has an opposing surface that is generally planar, said working surface and said opposing surface being in surface-to-surface confrontation.

16. A shock-absorbing face guard connector as set forth in claim 13, further comprising a plate, said sleeve extending from said plate.

17. A shock-absorbing face guard connector, comprising:
a base having a first bore and a cavity;
a compressible piece residing in said cavity, said compressible piece having a first surface that is generally planar;
a plate and sleeve unit having a plate portion and a sleeve portion, said plate portion situated at a top side of said base and said sleeve portion residing in said cavity, said sleeve portion having a second bore spanning partially through the sleeve and having a second surface that is generally planar; and
a fastener assembly received through said second bore of said sleeve, said fastener assembly including a fastener;
wherein, in assembly of the shock-absorbing face guard connector, said first surface of said compressible piece and said second surface of said plate and sleeve unit make surface-to-surface confrontation.

18. A shock-absorbing face guard connector as set forth in claim 17, wherein the surface-to-surface confrontation between said first and second surfaces spans the full transverse extent of said first surface of said compressible piece.

19. A shock-absorbing face guard connector as set forth in claim 17, wherein the surface-to-surface confrontation between said first and second surfaces spans fully across a transverse extent of said cavity at the surface-to-surface confrontation.

20. A shock-absorbing face guard connector as set forth in claim 17, wherein, during use of the shock-absorbing face guard connector and upon impact to a face guard connected by the shock-absorbing face guard connector, said base moves relative to said plate and sleeve unit and relative to said fastener assembly, the movement effects compression of said compressible piece, and, via the surface-to-surface confrontation between said first and second surfaces, substantially all of said compressible piece undergoes compression amid movement of said base relative to said plate and sleeve unit and relative to said fastener assembly.

* * * * *